United States Patent [19]

Kohno et al.

[11] Patent Number: 4,834,469
[45] Date of Patent: May 30, 1989

[54] BRAKE PRESSURE CONTROL SYSTEM

[75] Inventors: Teruhisa Kohno; Kōichi Hashida, both of Itami, Japan

[73] Assignee: Sumitomo Electric Industries, Ltd., Osaka, Japan

[21] Appl. No.: 178,053
[22] PCT Filed: Aug. 27, 1987
[86] PCT No.: PCT/JP87/00638
 § 371 Date: Feb. 11, 1988
 § 102(e) Date: Feb. 11, 1988
[87] PCT Pub. No.: WO88/01583
 PCT Pub. Date: Mar. 10, 1988

[30] Foreign Application Priority Data

Aug. 30, 1986 [JP] Japan ................. 61-204533

[51] Int. Cl.[4] ............. B60T 8/46; B60T 8/88; B60T 13/68
[52] U.S. Cl. ................... 303/119; 303/68; 303/92; 303/110; 303/116
[58] Field of Search .................. 303/110-119, 303/68-69, 92, 9.72, 84.1, 84.2, 13-15; 188/151 A, 181; 180/197, 244; 251/129.02, 129.21

[56] References Cited

U.S. PATENT DOCUMENTS

| 3,667,813 | 6/1972 | Burckhardt et al. | 188/181 C X |
| 3,697,138 | 10/1972 | Marting | 303/9.72 |
| 3,771,839 | 11/1973 | Fink | 303/119 X |
| 3,975,061 | 8/1976 | Kondo et al. | 303/119 X |
| 4,215,902 | 8/1980 | Sato et al. | 303/119 |
| 4,416,347 | 11/1983 | Bertling et al. | 303/110 X |
| 4,482,192 | 11/1984 | Leiber | 303/119 X |
| 4,561,701 | 12/1985 | Fujii et al. | 303/119 |

FOREIGN PATENT DOCUMENTS

| 3440541 | 5/1986 | Fed. Rep. of Germany | 303/92 |
| 50-48366 | 4/1975 | Japan . | |
| 57-22948 | 2/1982 | Japan . | |
| 62-46752 | 2/1987 | Japan . | |
| 2165905 | 4/1986 | United Kingdom | 303/119 |

Primary Examiner—Douglas C. Butler
Attorney, Agent, or Firm—Wenderoth, Lind & Ponack

[57] ABSTRACT

In a brake pressure control system provided with a discharge valve in its discharge line for the control fluid from a control chamber, the discharge valve having an on-off valve for opening and closing the discharge line so that when the discharge valve is opened, the control fluid pressure in the control chamber will be lowered to reduce directly or indirectly the braking force on the vehicle, the present invention provides a system having a second discharge valve arranged in series in the discharge line. With this system, even if one of the valves should fail to close the discharge line, the other valve will act to prevent the leakage of the control fluid pressure in the control chamber.

8 Claims, 3 Drawing Sheets

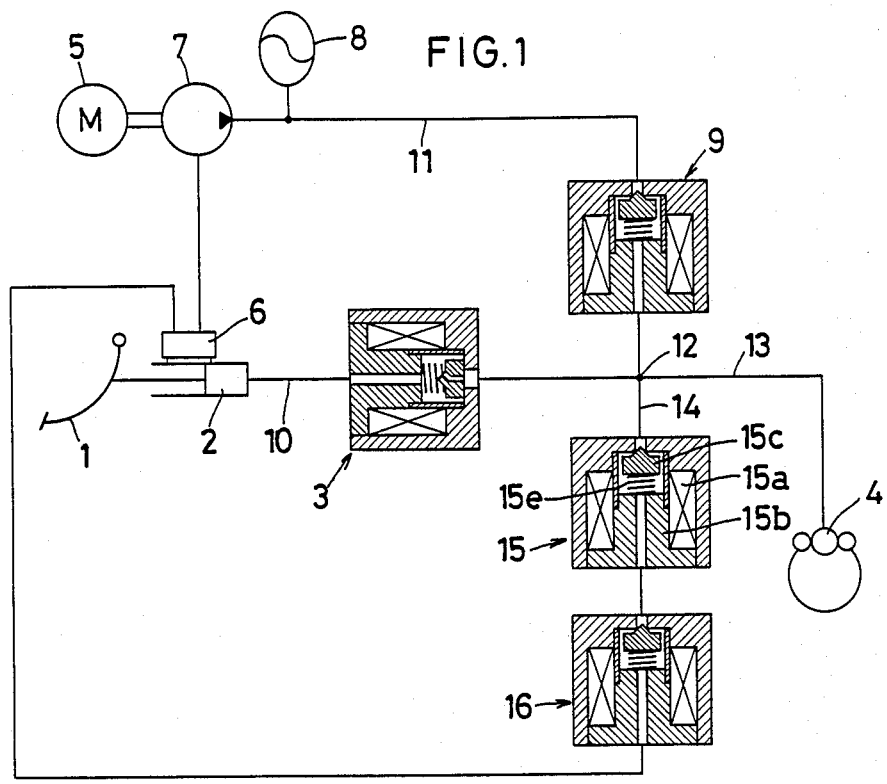

BRAKE PRESSURE CONTROL SYSTEM

FIELD OF TECHNOLOGY

The present invention relates to a failsafe, highly reliable brake pressure control system for use with a vehicle having two brake piping lines and which provides various types of brake force control including boost control of braking force, control of distribution of braking force, antilock control, traction control for the wheels, and automatic braking for maintaining the stopped state, adjusting the distance between the cars, and avoiding obstacles on the road.

TECHNOLOGICAL BACKGROUND

The abovementioned various types of controls of braking force have heretofore been dealt individually by means of separate control units or separate systems each including an electronic control unit. However, such controls are possible by combining the increase, decrease and retaining of the brake fluid pressure both in braking and non-braking conditions. If one individual unit or system is allocated to each control factor, similar control elements have to be used for different controls, thus incurring such problems as economical loss, poor reliability, reduction in the space available in the vehicle and increase in the overall weight of the vehicle. An integrated system which can comprehensively deal all the controls would be very desirable.

In U.S. Pat. No. 3,667,813, there is disclosed a system which solves the abovesaid problem in the simplest way. In this system, a shut-off valve is provided in a piping line connecting a master cylinder with a wheel brake so as to open and close the brake fluid feed line. Also, between the shut-off valve and the brake are provided an access valve which electromagnetically changes over to selectively introduce or hold the pump pressure produced by a pump provided separately from the master cylinder and an electromagnetic discharge valve for selectively discharging or holding the fluid pressure so as to apply a pump pressure to the brakes and achieve a desired braking force. Besides, many similar systems are known in which an electromagnetic discharge valve is provided directly in a brake piping line. Also known are systems adapted to control the brake force indirectly by controlling the pressure in a control system.

In contrast, in a system in which a discharge valve is directly connected to a brake line, the malfunction of the discharge valve owing to worn sealing surfaces or foreign matters mixed in the brake fluid will directly lead to the loss of pressure on the brakes, thus bringing about a grave danger.

Many of the systems having a control line separate from the brake line are provided with various failsafe mechanisms so that the brake line will supply brake pressure even in case of the failure of a discharge valve disposed in the control line. But these systems have their drawbacks in that they structurally consume more brake fluid for the brake line and that the maximum attainable brake pressure is insufficient.

An object of the present invention is to solve the grave and critical problems of the prior art.

DISCLOSURE OF INVENTION

In order to achieve this object, the present invention provides a brake pressure control system including a discharge valve provided in a discharge line for control fluid fed from a control chamber and having an on-off valve means for opening and closing the discharge line, the opening lowering the control fluid pressure in the control chamber to reduce the braking force directly or indirectly, characterized in that two or more valve means of the discharge valves are provided in series in the discharge line.

Thus, even if any one of the valves should lose its sealing function for some reason, the remaining normal valve will prevent the leakage of the control fluid from the control chamber, thus avoiding the abovesaid problems.

The system of the present invention provides an economical arrangement and yet improves the safety of the vehicle equipped with the system. The safety of the system is further improved by designing the second valve to stop it from opening by utilizing an increase in the valve-closing force by the fluid pressure in case of a failure of the first valve.

The present invention is applicable both to a system in which valves of various types, important elements of the present invention, are directly provided in a brake piping line or in a system adapted to indirectly control the brake force by controlling the pressure in a control chamber. In other words, the same effects can be achieved in an indirect control system and various failsafe mechanisms used in the prior art system are not required any more.

The term "control chamber" herein used refers to the area where the control fluid from the pressure source is present.

BRIEF DESCRIPTION OF THE DRAWINGS

FIGS. 1 to 4 are circuit diagrams of embodiments of brake systems of the present invention with the electromagnetic valves shown in section.

BEST MODE FOR EMBODYING THE INVENTION

Figure 3:
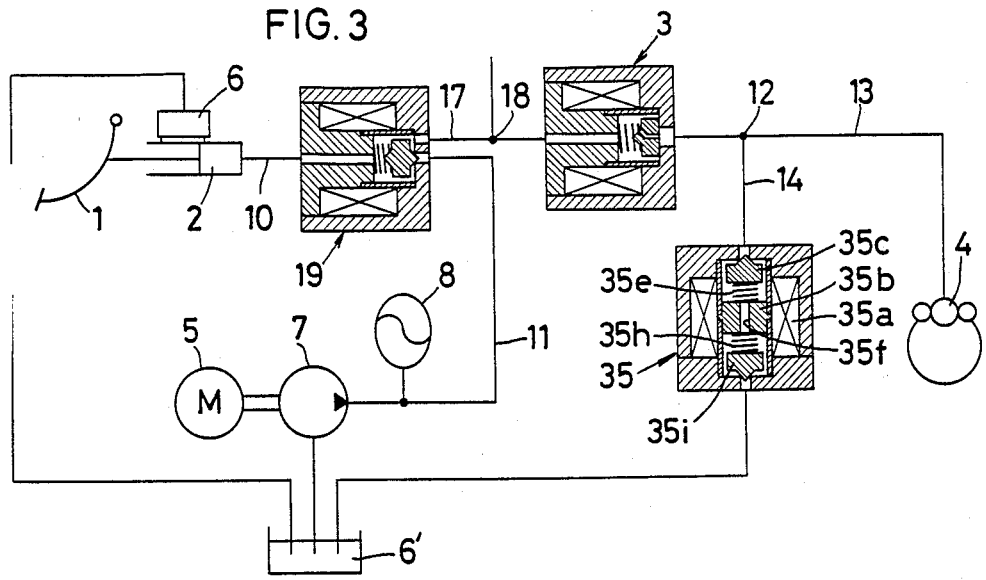

In the system of the first embodiment shown in FIG. 1, when a brake pedal 1 is stamped down, a brake fluid pressure will be produced in a master cylinder 2 and be transmitted to a wheel brake 4 through a normally open electromagnetic shut-off valve 3. As a second fluid pressure source for the system, there is provided a pump 7 driven by an electric motor 5 to suck and pressurize brake fluid from a reservoir tank 6 for the master cylinder 2. The brake fluid pressurized by the pump 7 is stored in a pressure accumulator 8 and flows through a normally closed electromagnetic access valve 9, past a junction point 12 between a line 10 for the pressurized fluid from the master cylinder and a pump pressure feed line 11, and through a line 13 to the brake. To the junction point 12 is connected a discharge line 14 leading to the reservoir tank 6. Two electromagnetic discharge valves 15 and 16 of a normally closed type are provided in series in the discharge line 14.

The discharge valve 15 comprises an iron core 15b, an electromagnetic coil 15a wound around the core, a movable valve body 15c adapted to be attracted to the iron core 15b to open the discharge line 14, and a spring 15e normally biasing the valve body 15c to the valve-closing position. The discharge valve 16 and the access valve 9 are of the same construction as the valve 15.

With the system of this embodiment, when the shut-off valve 3 and the access valve 9 are energized and the discharge valves 15 and 16 deenergized, the lines 10 and 14 are closed while the line 11 is opened. In this state, the brake fluid pressurized by the pump 7 and stored in the pressure accumulator 8 flows into the line 13 to apply fluid pressure to the wheel brake 4. If the access valve 9 is deactivated and the discharge valves 15 and 16 activated to close the line 11 and open the line 14, the brake fluid in the line 13 will be discharged through the line 14 to lower the pressure on the wheel brake 4. If the access valve 9 and the discharge valves 15 and 16 are deactivated, the pressure on the wheel brake 4 will be maintained at a constant level.

Thus with this system, a desired fluid pressure can be applied to the brake, regardless of whether the master cylinder is producing pressure or not, by controlling the access valve 9 and the discharge valves 15 and 16 while keeping the line 10 closed by means of the shut-off valve 3. The timing of activating and deactivating each valve can be determined on the basis of information supplied from sensors. The system of the present invention thus provides an integrated control of the braking forces which includes an antilock control, traction control for the driving wheels, control for keeping the vehicle stopped, booster control, control of the distribution of braking force, and control for the adjustment of the distance between the cars or for avoiding obstacles on the road.

Since in the discharge line 14 two on-off valve means are provided in series each comprising a movable valve body 15c adapted to abut a valve seat, even if one of the two valves should fail to function, the other valve will surely shut off the discharge line, thereby ensuring a reliable control of the braking force. Even in case the fluid pressure generated in the master cylinder 2 is applied directly to the brake owing to the failure of the second fluid pressure source, the driver will feel an unchanged braking effect as if both the master cylinder and the pump circuit were normally working.

FIG. 2 shows a second embodiment of the present invention which is different from the first embodiment in that a 3-port 2-position electromagnetic changeover valve 19 is provided in the lines 10 and 11 in order to selectively supply either the pressurized fluid in the master cylinder or the fluid from the pump circuit to a line 17, and in that the line 17 leading to the shut-off valve 3 is branched at a junction point 18 to another wheel brake, and in that a discharge valve 25 having two on-off valve means is provided in the discharge line 14.

In this embodiment, pressure is applied to the wheel brake 4 by energizing only the changeover valve 19 and the pressure in the line 13 can be kept constant by energizing the shut-off valve 3. The system of the second embodiment can be more advantageously used when it is necessary to control the pressures on two brakes independently. With the system of the first embodiment, two shut-off valves, two access valves and two pairs of discharge valves, a total of eight valves are needed since any line to another brake is branched from a junction point provided on the line 10. With the system of the second embodiment, since the line is branched after either the fluid from the master cylinder or the fluid from the pump circuit has been selected by the changeover valve 19, only one changeover valve is needed instead of two access valves as in the first embodiment. Further only one discharge valve 25 will suffice for the system since it contains two on-off valves. Thus, a total of five valves are needed for the system of the second embodiment.

The discharge valve 25 comprises an iron core 25b, an electromagnetic coil 25a wound around the core 25b, a movable valve body 25c adapted to be attracted to the iron core 25b to open the discharge line 14, a spring 25e for biasing the valve body 25c to the valve-opening position, a rod member 25g extending through a passage 25f formed in the iron core 25b, a second movable valve body 25i provided at the other end of the iron core 25b, and a spring 25h for normally biasing the second valve body 25i in the same direction as the valve body 25c so as to close the passage 25f. When the valve body 25c is attracted to the iron core 25b to open the discharge line 14, it pushes down the rod member 25g, thus forcing the second movable valve body 25i away from the iron core 25b to open the passage 25f forming a part of the discharge line. Thus, the pressure in the line 13 is controlled in the same manner as in the first embodiment. Even if one of the movable valve bodies 25c and 25i should lose its sealing function, the other will surely close the discharge line to prevent the leakage of pressure.

The system of the third embodiment shown in FIG. 3 is substantially the same as the second embodiment with the exception that there is provided a second reservoir tank 6' in communication with the reservoir tank 6 and connected to an intake port of the pump 7 and the outlet of the discharge line 14 and that the discharge valve 35 provided in the discharge line 14 is somewhat different in construction from the discharge valve 25 in the second embodiment. By providing the second tank 6' separately from the master cylinder, a sufficient amount of fluid will be available for circulation in the control chamber even if the vehicle cannot afford enough space for the capacity of the first tank 6. Further, the discharge valve 35 has a simpler structure so that it can be manufactured easily and can be used more safely.

The discharge valve 35 comprises an electromagnetic coil 35a and provided with a passage 35f, an iron core 35b energized by the coil 35a, movable valve bodies 35c, 35i provided at both ends of the core 35b, which core 35b is provided with a passage 35f, and springs 35e and 35h for biasing the respective movable valve bodies 35c, 35i away from the core 35b to close the valve 35 (the valve body 35c is biased against the flow of the brake fluid and the valve body 35i is biased in the direction of flow). The discharge valve 35 is different from the discharge valve 25 of the second embodiment shown in FIG. 2 in that not only the movable valve body 35c but also the valve body 35i are attracted to the magnetized core 35b to open the valve.

With the discharge valve 35, the brake fluid pressure acts only on the first on-off valve means, that is, the movable valve body 35c but not on the second on-off valve means, that is, the movable valve body 35i. Thus, if the valve body 35c is working normally to close up the discharge line 14 perfectly, the valve body 35i can be attracted to the core by a small electromagnetic force which is barely enough to overcome the bias of the spring 35h. But if the valve body 35c should lose its sealing capability, the pressure of the brake fluid will act on the valve body 35i, increasing the valve-closing force. In this case, the electromagnetic force required to bring the valve body 35i into the valve-opening position is more than the sum of the bias of the spring 35h and the closing pressure of the brake fluid on the valve body 35i. But for safety's sake, the electromagnetic force should be set so as to satisfy the following formula (wherein f1 is the electromagnetic force, f2 the bias of the spring 35h, and f3 the closing pressure of the brake fluid on the valve body 35i)

$$f2 < f1 < f2 + f3 \tag{1}$$

If f1 > f2+f3, the failure of sealing by the valve body 35c cannot be detected as long as the valve body 35i is normally performing to close the discharge line, compensating for the failure of the valve body 35c. In contrast, if the forces are set to satisfy the formula (1), the electromagnetic force generated by energizing the coil 35a is not strong enough to move the valve body 35i and open the discharge line 14. Thus the failure of the valve body 35c will be detected and a warning generated directly from the abnormal state of pressure in the line 13 or indirectly from the abnormal rotation of the wheels which results from the failure of the valve body 35i. The other functions and effect of the third embodiment are substantially the same as in the first and second embodiments.

Figure 4:
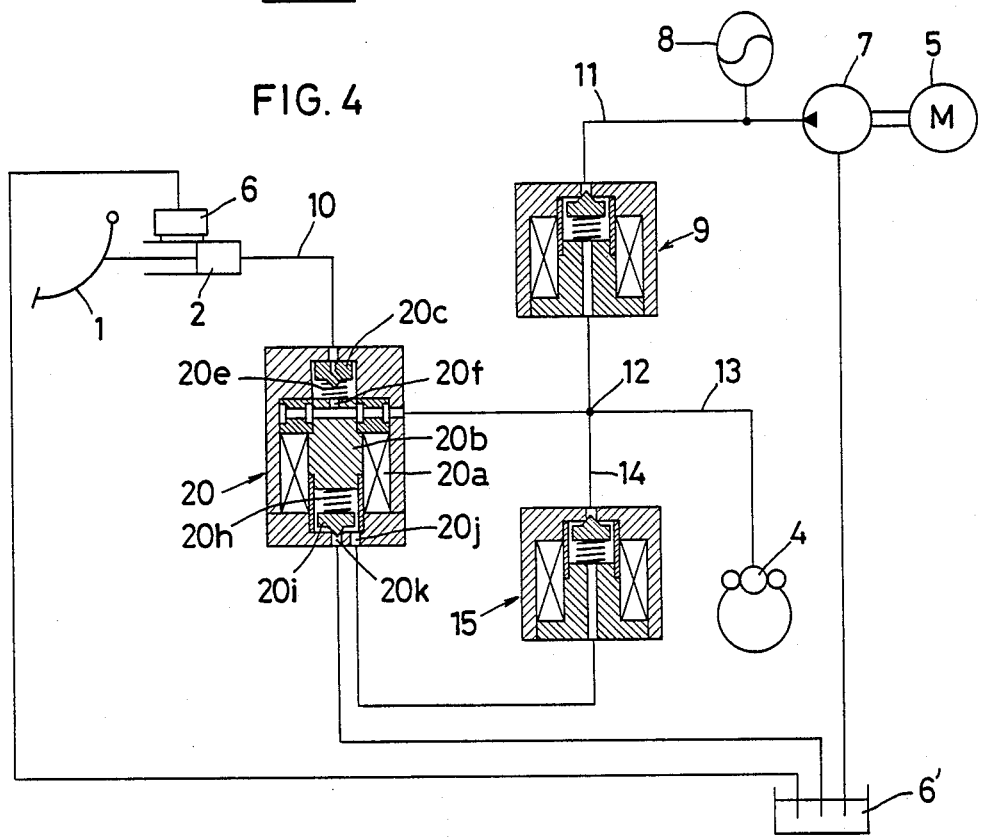

FIG. 4 shows a fourth embodiment which is similar to the first embodiment in that a shut-off valve is provided between the master cylinder 2 and the brake 4, that the same access valve 9 is provided in the line 11 extending from the pump 7 to the junction point 12 and that the discharge valve 15 and a second discharge valve are provided in the discharge line 14, but is different therefrom in that the shut-off valve and the second discharge valve are incorporated into one electromagnetic valve 20 so as to work with each other.

The electromagnetic valve 20 comprises an iron core 20b, an electromagnetic coil 20a wound around the core, a movable valve body 20c adapted to be attracted to the core 20b to cut off the flow through a passage 20f formed between the lines 10 and 13, a spring 20e normally biasing the valve body 20c away from the core to open the passage 20f, a second movable valve body 20i disposed at the other end of the core 20b, and a spring 20h biasing the valve body 20i away from the core to close a passage 20k in communication with the discharge line 14 through a passage 20j. When the coil 20a is not energized, the valve bodies 20c and 20i are in the positions as shown in FIG. 4, communicating the line 10 with the line 13 while cutting off the fluid flow through the discharge line 14 leading to the tank 6' in cooperation with the shut-off valve 15.

Upon start of the brake pressure control, it is necessary to energize the electromagnetic coil 20a to bring the shut-off valve comprising the valve body 20c and its valve seat on the iron core 20b to the valve-closing position in order to cut off the communication between the master cylinder 2 and the brake 4. Simultaneously with the excitation of the coil 20a, the valve body 20i which constitutes the second discharge valve is attracted to the core 20b to open the passage 20k. The electromagnetic force generated by the excitation of the coil 20a and other forces should satisfy the formula (1) shown in the description of the third embodiment so that if the discharge valve 15 should fail to cut off the discharge line 14, the valve body 20i will remain in the valve-closing position under the brake fluid pressure even if the coil 20a is energized. It is also preferable to provide a device which detects an abnormal condition of the pressure in the line 13 or the speed of rotation of the wheel and gives a warning of the failure of the first valve. The tank 6' is provided as in the third embodiment but it need not be provided in this embodiment.

Figure 5:
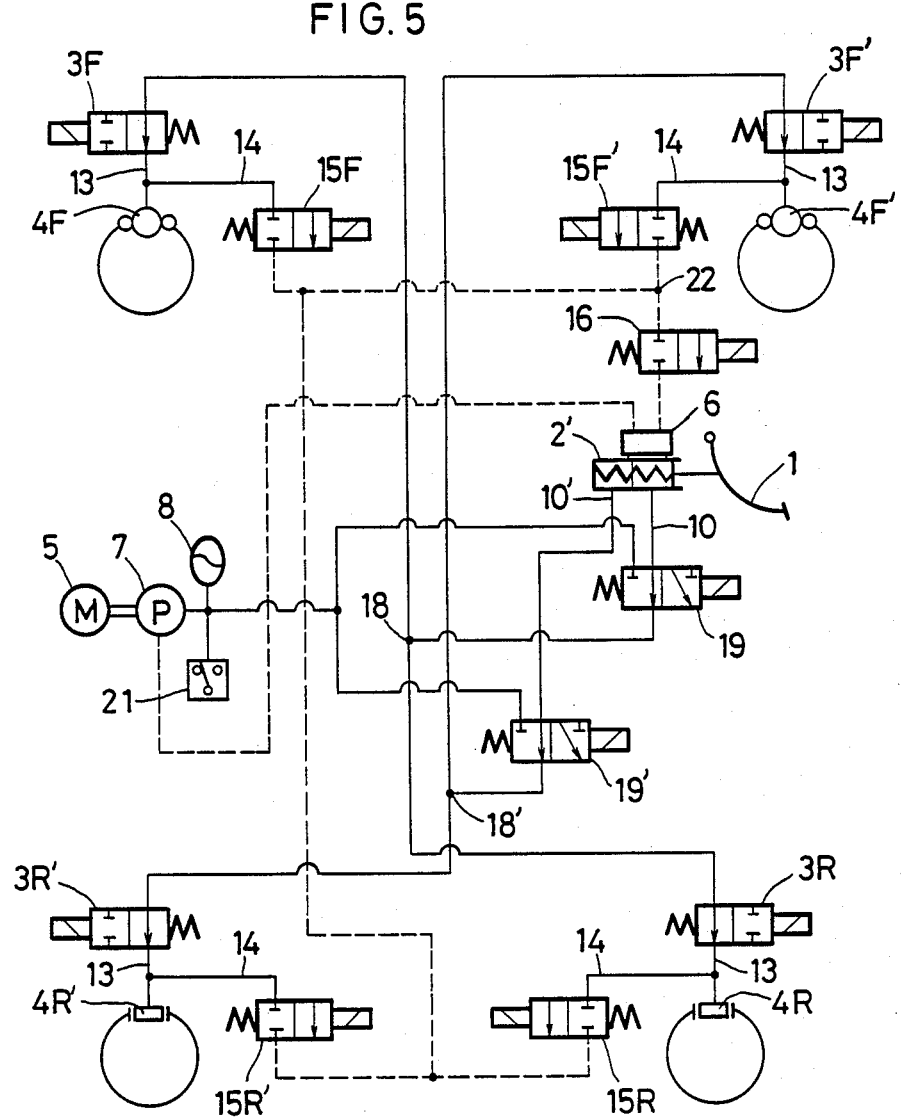
FIG. 5 is a circuit diagram of the entire system according to the present invention.

FIG. 5 shows the fifth embodiment in which the brake pressure control system is applied to a diagonal split piping. The brake fluids in separate chambers of a tandem master cylinder 2', pressurized by stamping down the brake pedal 1, flow out through lines 10 and 10' and through 3-port 2-position electromagnetic changeover valves 19 and 19' so that each of the fluid flows will be divided at points 18 and 18' into two branches, i.e. the flow toward a front wheel and the flow toward a rear wheel. The flows toward the front wheels are fed to front brakes 4F and 4F' through normally open shut-off valves 3F and 3F', respectively. The flows toward the rear wheels are fed to rear brakes 4R and 4R' through normally open shut-off valves 3R and 3R', respectively.

The changeover valves 19 and 19' are provided in each of the two independent pipe lines so as to selectively supply either the fluid from the pump 7 or the fluid from the master cylinder 2' into the lines leading to the brakes. The pump pressure is generated by the pump 7, stored in the pressure accumulator 8, and kept constant by turning on and off the motor 5 for the pump 7 by means of a pressure switch 21. Discharge lines 14 branch from lines 13 connecting the shut-off valves 3F, 3F', 3R and 3R' for the brakes and lead to the reservoir tank 6. Normally closed first discharge valves 15F, 15F', 15R and 15R' are provided along the discharge lines. The brake fluid flows discharged through the discharge valves are joined together at a junction point 22 to return to the reservoir tank 6 through a second discharge valve 16 of a normally closed type.

If the second discharge valve 16 is adapted to work synchronously with any of the first discharge valves 15F, 15F', 15R and 15R', the system will work as though there was no second discharge valve 16 when the first discharge valves function normally. If any of the first discharge valves should lose their sealing function, the discharge valve 16 serves to prevent the brake pressure in the control line from falling.

Further, by setting the electromagnetic force of the second discharge valve at such a value as to allow its movable valve body to be attracted to the valve-opening position only when the fluid pressure is not acting on the valve body as a valve-closing force, the failure of any of the first discharge valves will be detected since at that time the second discharge valve stops functioning to open the valve.

In FIG. 5 showing the fifth embodiment, the reference characters F and R attached to numerals 3, 4 and 15 are used to designate the front wheel line and the rear wheel line, respectively. The primed and unprimed numerals are used to distinguish the right side wheels from the left side ones.

We claim:

1. A brake pressure control system comprising:
   a hydraulic wheel brake;
   a control chamber containing hydraulic fluid and communicating with said hydraulic wheel brake to supply hydraulic braking fluid thereto;
   a discharge line extending from said control chamber;
   at least two normally closed discharge valves connected in series in said discharge line, and electromagnetic means operatively associated with said discharge valves for controlling the opening and closing thereof in response to antilock control, traction control and the like for the brake pressure control system to control the discharge of hydraulic fluid from said control chamber, the downstream one of said discharge valves being operable to remain closed when the upstream one of said discharge valves fails.

2. A brake pressure control system as claimed in claim 1 further comprising a single valve housing having said two discharge valves therein, a fixed iron core in said housing, said upstream one of said discharge valves having a valve member attractable by said iron core to be moved to the open position when said core is energized in response to the desired control, the downstream one of said discharge valves having a valve member which is mechanically linked to said the upstream one of said discharge valves for being moved to the open position when the valve member of said upsteam discharge valve is opened and further having means for closing the valve member of said downstream discharge valve when the valve member of said upstream discharge valve is closed and for holding said valve member of said downstream discharge valve closed when said upstream discharge valve member fails.

3. A brake pressure control system as claimed in claim 1 further comprising a single valve housing having said two discharge valves therein, a fixed iron core in said housing, said discharge valves each having a valve member attractable by said iron core to be moved to the open position when said core is energized in response to the desired control, and further having means for closing the valve member of said downstream discharge valve when the iron core is deenergized for holding said valve member of said downstream discharge valve closed when said upstream discharge member fails.

4. A brake pressure control system as claimed in claim 3 in which said valve member of said downstream discharge valve is closable in the direction of flow of hydraulic fluid through said discharge valves.

5. A brake pressure control system as claimed in claim 4 in which said means for closing the valve member of said downstream discharge valve is a spring means, and said iron core having an attractive force for attracting said valve member of the downstream discharge valve with a force which is smaller than the sum of the fluid pressure prior to the energization of said iron core and the bias force of said spring, and which is greater than the bias force of said spring along.

6. A brake pressure control system as claimed in claim 1 further comprising a first valve housing containing said upstream discharge valve, and a further valve housing containing said downstream discharge valve and a fluid pressure control valve separate from said downstream discharge valve for controlling fluid pressure in said brake pressure control system upstream of said control chamber, said further valve housing having electromagnetic means for simultaneously controlling both said downstream discharge valve and said fluid pressure control valve for opening said valves when said electromagnetic means is energized.

7. A brake pressure control system as claimed in claim 6 in which said downstream discharge valve has a valve body movable in the closing direction in the same direction as the flow of fluid in said discharge line, and spring means biasing said valve body in the closing direction of said discharge valve, and said electromagnetic means has an attractive force exerted on said valve body in the opening direction of said downstream discharge valve which is smaller than the sum of the fluid pressure prior to the energization of said electromagnetic means and the bias force of said spring means and which is greater than the bias force of said spring means alone.

8. A brake pressure control system as claimed in claim 6 or 7 in which said fluid pressure control valve is an input valve for controlling the rate of flow of pressurized fluid into said control chamber.

* * * * *